3,600,145
PRODUCTION OF METHANE FROM
CARBON MONOXIDE AND STEAM
Marvin M. Johnson and William T. Nelson, Bartlesville,
Okla., assignors to Phillips Petroleum Company
No Drawing. Filed Apr. 9, 1968, Ser. No. 719,849
Int. Cl. C01b 2/10
U.S. Cl. 48—197                             5 Claims

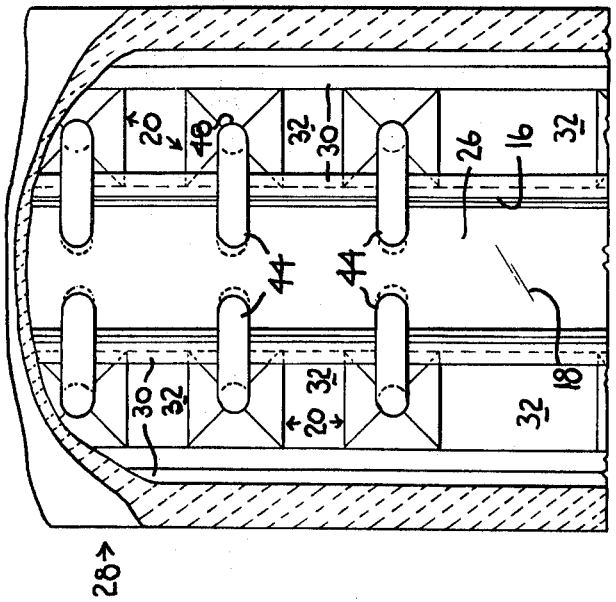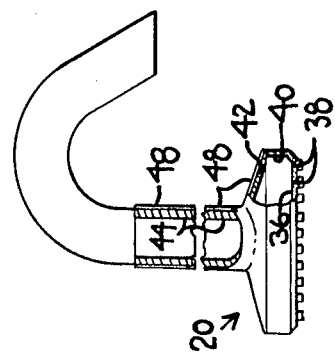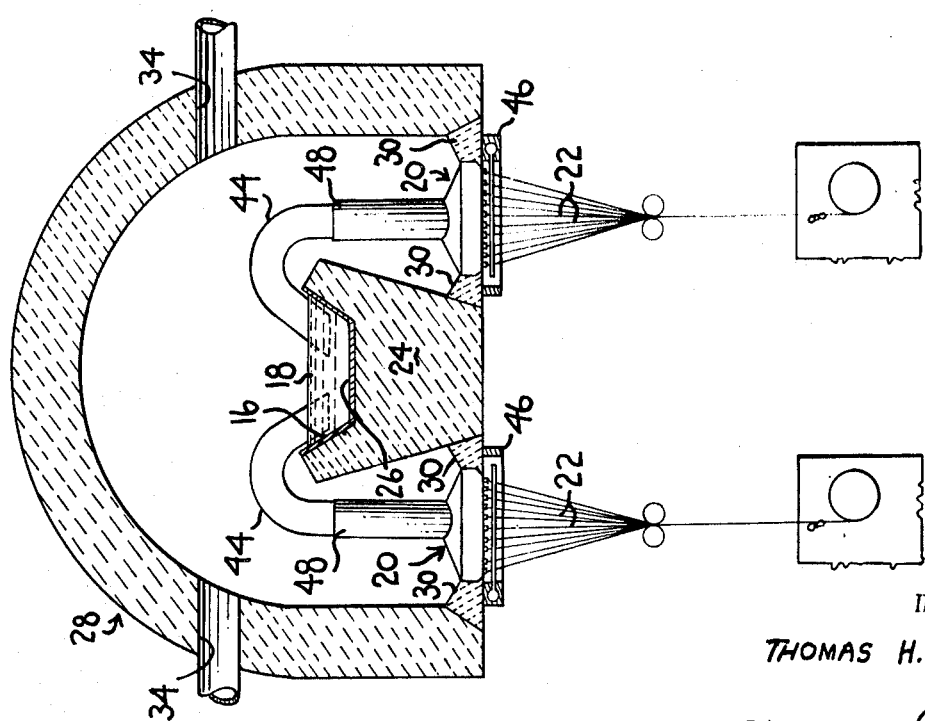

ABSTRACT OF THE DISCLOSURE

Carbon monoxide and steam are converted practically quantitatively to methane and carbon dioxide at a temperature of 400–2000° F., a pressure in the range of 0 to 1,000 pounds per square inch gage, gaseous hourly space rates for CO of 200–10,000 and at carbon monoxide to steam ratio (in moles) of from about 0.2 to about 20 over a nickel catalyst promoted with a barium salt of an organic acid, e.g., barium acetate, the catalyst being supported on an alumina-containing support material, e.g., alumina or calcium aluminate.

---

This invention relates to a process for the conversion of carbon monoxide and steam to form, practically quantitatively, methane.

In one of its concepts, the invention provides a process for the conversion of carbon monoxide and steam to methane by passing the same into contact with a nickel catalyst supported on a support such as alumina or calcium aluminate and promoted with a barium salt of an organic acid such as barium acetate.

Steam reforming of carbon monoxide to form normally liquid hydrocarbons employing a catalyst which may contain nickel and which may be supported on alumina is discussed in U.S. Patent No. 2,579,663, issued Dec. 25, 1951. Methane is indicated to have been formed in the examples of this patent.

We have now found that carbon monoxide and steam can be converted virtually quantitatively to methane and carbon dioxide employing a nickel methanation catalyst, e.g., nickel on calcium aluminate promoted with barium acetate. The reaction proceeds smoothly and it is possible to obtain methane as the only hydrocarbon product which can be detected in the effluent. Thus, the process requires only removal of most of the carbon dioxide to give a useful methane gas for many purposes including, particularly and importantly, as a substitute natural gas.

It is an object of this invention to convert carbon monoxide and steam to methane. It is another object of the invention to convert carbon monoxide and steam to carbon dioxide. It is a still further object of the invention to produce a methane-containing gas which can be used directly or with simple purification as a substitute natural gas and for other purposes. It is a further object of the invention to produce a substitute natural gas, e.g., a methane-containing gas from carbon monoxide and steam without forming any appreciable quantity of heavier or liquid hydrocarbons.

Other aspects, objects and the several advantages of the invention are apparent from a study of this disclosure and the appended claims.

According to the present invention, there is provided a process for the production of methane from carbon monoxide and steam which comprises passing a mixture of carbon monoxide and steam into contact with a supported nickel catalyst promoted with a barium salt of an organic acid.

This type of catalyst is effective for the methanation of carbon monoxide in the temperature range of from about 400–2,000° F., a pressure range of from about 0 to about 1,000 pounds per square inch gage, a gaseous hourly space rate for the carbon monoxide of approximately 200–10,000 and at carbon monoxide to steam ratios (in moles) of about 0.2 to 20. The ranges of operation now preferred are as follows:

| | |
|---|---|
| Temp., ° F. | 450–850 |
| Press., p.s.i.g. | 200–1000 |
| GHSR for CO | 500–5000 |
| CO/H$_2$O (mole) | 0.5–5 |

EXAMPLE

The following run was made by passing carbon monoxide and steam over a catalyst which contained 21 weight percent of reduced nickel on a calcium aluminate support. It was impregnated with 5.0 weight percent of barium acetate. It had a surface area of 44 meters$^2$/gram and a pore volume of 0.20 cc./gram.

| | |
|---|---|
| Avg. temp., F. | 780 |
| Press, p.s.i.g. | 300 |
| GHSR for CO | 850 |
| CO/H$_2$O (mole) | 3.6 |
| Mole H$_2$O cnsmd./mole of CO | 0.67 |

Effluent gas analyzed:
| | |
|---|---|
| Hydrogen mole percent | 5.8 |
| Methane | 20.5 |
| Carbon dioxide | 73.7 |

The operation of the foregoing example yielded no detectable liquid hydrocarbon and from the analysis of the effluent gas can be seen that methane was the only hydrocarbon present.

It will b eevident to one skilled in the art in possession of this disclosure having studied the same that considerable variation and modification can be made with this disclosure as a starting point. Depending upon the nature of the final product desired the conditions and catalyst and/or other variables can be modified to an extent consonant with the ultimate results selected or desired to be obtained. If a small amount of other hydrocarbons can be desirably obtained or tolerated, the essential character of the catalyst can be somewhat modified. However, at present such modification is not preferred because the present advantage of the invention is in the practically quantitative conversion of the carbon monoxide to methane as the only hydrocarbon in the effluent gas.

One skilled in the art given the conditions set forth herein can routinely select the particular conditions and catalysts, etc. suited to his purposes.

The nickel catalyst used in the process of our invention prior to impregnation with the barium salt can be either non-reduced or reduced and stabilized to prevent reaction with the oxygen in the air. The catalyst used in the process of our invention is preferably a supported nickel catalyst such as nickel-alumina-containing material containing 5 to 90 weight percent nickel on a reduced basis and 1 to 10 weight percent barium salt.

Instead of alumina, other natural or synthetic refractory base material supports, such as silica, alumina, zirconia, thoria, beryllia, boria, magnesia, titania, binary combinations thereof such as silica-alumina, silica-magnesia, boria-alumina, magnesia-alumina, beryllia-titania, and the like, and ternary combinations thereof, such as silica-alumina-thoria, silica-magnesia-zirconia, alumina-beryllia-titania, and the like; naturally occurring supports such as kieselguhr, diatomaceous earth, fuller's earth, perlite, and the like; Group II aluminate spinels and mixtures thereof, including mixtures of spinels and excess Group II metal oxide or spinels and excess alumina, such as calcium aluminate, zinc aluminate, magnesium aluminate, barium aluminate, beryllium aluminate, strontium aluminate, and the like; natural or synthetic crystalline aluminosilicates such as levynite, erionite, faujasite, analcite, noselite, heulandite, stilbite, phillipsite, brewsterite, datolite, chabazite, leucite, scapolite, mordenite, sodalite, calcium aluminosilicate, barium aluminosilicate, and the like, can be used. The nickel catalyst of the invention exhibits a considerably longer catalyst life than is obtained with other prior art promoted nickel catalysts.

Other alumina-containing supports can be used in this invention, and by alumina-containing is meant a compound containing $Al_2O_3$. For example, calcium aluminate can be represented by the chemical formula $CaO \cdot Al_2O_3$, calcium aluminosilicate by $CaO \cdot Al_2O_3 \cdot 2SiO_2$, and aluminum silicate by $Al_2O_3 \cdot SiO_2$ and $3Al_2O_3 \cdot 2SiO_2$.

The catalyst can be prepared by any of the procedures known to the industry, such as by impregnation of the support with aqueous or non-aqueous solutions of the active ingredients, coprecipitation of the active and support ingredients, physical mixing, and the like. The barium promoter can be added before, during, or after the addition of the nickel to the support, and can be added in the form of any salt of an organic acid or hydroxy-substituted organic acid that is soluble in water or an organic solvent. Any suitable nickel salt, such as nickel acetate, nickel nitrate, and the like, can be used. Examples of barium salts that can be used are the formate, acetate, propionate, butyrate, caproate, malate, gluconate, benzoate, salicylate, mandelate, cinnamate, and the like. A presently preferred method for preparing the catalyst of the invention is to precipitate a basic nickel carbonate in the presence of a support such as alumina, filter, dry, impregnate with a solution of a barium salt of an organic acid, and dry. For use in fixed-bed operation, the catalyst can be granulated or pelleted at any suitable point during the preparation, such as after the formation of the nickel-support mixture or after the formation of barium-nickel-support mixture. For use in fluidized-bed operation, such graulation or pelleting is unnecessary. As indicated above, the nickel component of the catalyst can be reduced and stabilized to prevent reaction with the oxygen in the air at any point subsequent to the addition of the nickel. Such reduction and stabilization permits loading the catalyst into the reactor and using it without a reduction step. However, it is within the scope of the invention to reduce the catalyst with hydrogen or a hydrogen-containing gas after it is in the reactor.

The carbon monoxide and steam feedstock, according to the invention, will not contain any poisons which may be detrimental to the catalyst as one skilled in the art will understand. If desired, some of the "spent" catalyst can be used in a guard chamber to remove catalyst poisons. Or other materials can be used in a guard chamber which will react or absorb or adsorb undesired poisons, e.g., molecular sieve.

It is now preferred to use a nickel catalyst supported on calcium aluminate and promoted with barium acetate containing 20 to 50 weight percent nickel on a reduced basis and 1 to 6 weight percent barium acetate.

Reasonable variation and modification are possible within the scope of the foregoing disclosure and the appended claims to the invention the essence of which is that there has been provided a process for the methanation of carbon monoxide and steam the process comprising essentially contacting these gases with a barium-promoted supported nickel catalyst as herein described.

We claim:

1. A process for the conversion of a feed consisting essentially of carbon monoxide and steam to a gas containing methane and carbon dioxide which comprises contacting carbon monoxide and steam at an elevated temperature with a catalyst consisting essentially of nickel supported on calcium aluminate said catalyst being promoted with a barium salt of an organic acid wherein the catalyst contains from about 5 to about 90 weight percent nickel and from about 1 to about 10 weight percent barium salt and wherein the conditions include a temperature in the range of from about 400 to about 2000° F., a pressure in the range of from about 0 to 1000 pounds per square inch, a gaseous hourly space rate for carbon monoxide from about 200 to about 10,000 and a carbon monoxide to steam ratio in moles of from about 0.2 to about 20.

2. A process according to claim 1 wherein the catalyst is a nickel-calcium aluminate catalyst which has been impregnated with barium acetate during its preparation.

3. A process according to claim 1 wherein the conditions include a temperature in the range of from about 450 to about 850° F., a pressure in the range of from about 200 to 1,000 pounds per square inch, a gaseous hourly space rate for carbon monoxide from about 500 to about 5,000 and a carbon monoxide to steam ratio in moles of from about 0.5 to about 5.

4. A process according to claim 1 wherein the catalyst is nickel supported on calcium aluminate and promoted with barium acetate and the catalyst contains 5 to 90 weight percent nickel, 1 to 10 weight percent barium acetate with the remainder being essentially a calcium aluminate support, the conditions of operation being a temperature of 450° F.–850° F., a pressure of 200–1,000 pounds per square inch, a gaseous hourly space rate for carbon monoxide of 500–5,000 and a carbon monoxide to steam mol ratio in moles of 0.5–5, the conditions being on an approximate basis.

5. A process according to claim 4 wherein the catalyst contains 20 to 50 weight percent nickel and 1 to 6 weight percent barium acetate.

References Cited

UNITED STATES PATENTS

| | | | |
|---|---|---|---|
| 3,334,055 | 8/1967 | Dowden | 48—214X |
| 3,423,194 | 1/1969 | Kearby | 48—214 |
| 2,151,329 | 3/1939 | Page | 48—197UX |
| 2,579,663 | 12/1951 | Gilbert | 260—449.6 |
| 2,694,624 | 11/1954 | Sweetser | 48—197 |
| 2,892,685 | 6/1959 | Paull | 48—196X |

JOSEPH SCOVRONEK, Primary Examiner

S. MARANTZ, Assistant Examiner

U.S. Cl. X.R.

260—449.6

UNITED STATES PATENT OFFICE
CERTIFICATE OF CORRECTION

Patent No. 3,600,145  Dated August 17, 1971

Inventor(s) Marvin M. Johnson, et. al.

It is certified that error appears in the above-identified patent and that said Letters Patent are hereby corrected as shown below:

Column 1, lines 16 and 17, and column 2, lines 3 and 4, "about 0.2 to about 20" should read -- about 0.05 to about 5 -- . Column 2, line 10, "0.5 to about 5" should read -- 0.2 to about 2 -- ; line 22, "3.6" should read -- 0.278 -- . Claim 1, line 21, "about 0.2 to about 20" should read -- about 0.05 to about 5 -- . Claim 3, line 31, "about 0.5 to about 5" should read -- about 0.2 to about 2 -- . Claim 4, line 41, "0.5 - 5" should read -- 0.2 - 2 -- .

Signed and sealed this 27th day of March 1973.

(SEAL)
Attest:

EDWARD M. FLETCHER, JR.
Attesting Officer

ROBERT GOTTSCHALK
Commissioner of Patents